(12) United States Patent
Batzer et al.

(10) Patent No.: US 9,352,714 B2
(45) Date of Patent: May 31, 2016

(54) ADJUSTABLE SIDE UNDER-RIDE GUARD FOR SLIDING AXLE TRAILER

(71) Applicants: Stephen Allen Batzer, Fife Lake, MI (US); Patrick Keith Rogers, Fayetteville, AR (US)

(72) Inventors: Stephen Allen Batzer, Fife Lake, MI (US); Patrick Keith Rogers, Fayetteville, AR (US)

( * ) Notice: Subject to any disclaimer, the term of this patent is extended or adjusted under 35 U.S.C. 154(b) by 0 days.

(21) Appl. No.: 14/510,314

(22) Filed: Oct. 9, 2014

(65) Prior Publication Data

US 2016/0101752 A1  Apr. 14, 2016

(51) Int. Cl.
*B60R 19/48* (2006.01)
*B60R 19/42* (2006.01)
*B62D 53/06* (2006.01)

(52) U.S. Cl.
CPC .............. *B60R 19/42* (2013.01); *B62D 53/068* (2013.01)

(58) Field of Classification Search
CPC ............................. B60R 19/42; B62D 53/068
See application file for complete search history.

(56) References Cited

U.S. PATENT DOCUMENTS

| | | | |
|---|---|---|---|
| 2,002,832 | A | 5/1935 | Robinson |
| 4,060,268 | A | 11/1977 | Page |
| 6,450,556 | B1 | 9/2002 | Jacobs |
| 6,626,475 | B2 | 9/2003 | Schroeder |
| 7,086,674 | B2 | 8/2006 | Goertz |
| 7,188,875 | B2 | 3/2007 | Norelius |
| 7,407,204 | B2 | 8/2008 | Eriksson |
| 7,780,224 | B2 | 8/2010 | Roush |
| 7,967,349 | B2 | 6/2011 | Puppini |
| 8,028,784 | B1 * | 10/2011 | Van Ginkel ............. B60P 1/435 180/209 |
| 8,162,384 | B2 | 4/2012 | Giromini |
| 8,322,778 | B1 * | 12/2012 | Pfaff .................... B62D 35/001 296/180.4 |
| 2008/0116702 | A1 | 5/2008 | Enz |
| 2011/0068605 | A1 * | 3/2011 | Domo .................... B62D 35/02 296/180.4 |

OTHER PUBLICATIONS

Bloch, et al. "Improved Crashworthy Designs for Truck Underride Guards," 1998 Enhanced Safety of Vehicles Conference, Paper No. 98-S4-O-07, 1998, pp. 833-846, NHTSA, USA.
Trego, et al., "A Scientific Approach to Tractor-Trailer Side Underride Analysis," Society of Automotive Engineers Paper No. 2003-01-0178, 2003, USA.
Padmanaban, Jeya, "Estimating Side Underride Fatalities Using Field Data," 57th AAAM Annual Conference Annals of Advances in Automotive Medicine, Sep. 22-25, 2013, pp. 225-232, USA.

* cited by examiner

Primary Examiner — Lori L Lyjak

(57) ABSTRACT

A side under-ride collision guard is described that is configured to be mounted on a large trailer that has been equipped with a sliding rear axle, consisting of one or more energy absorbing beam structures axially adjustable for position attached to a multiplicity of parallel rails to diminish the impact hazard to other roadway users that is presented by the lower axial edge(s) of the cargo compartment in the region(s) that are present between the trailer's rear most tires and the trailer's rear under-ride guard and/or between a stationary forward under-ride guard and the trailer's front most tires.

20 Claims, 6 Drawing Sheets

ADJUSTABLE SIDE UNDER-RIDE GUARD FOR SLIDING AXLE TRAILER

CROSS-REFERENCE TO RELATED APPLICATIONS

None

BACKGROUND OF THE INVENTION

The recognized hazard of side collisions against towed trailers can be traced at least back to 1938 in which Robinson invented a peripheral guard for a hitch-mounted trailer. See U.S. Pat. No. 2,002,832. His patent teaches a fixed full periphery guard for a towed trailer with fixed rear axle. This non-adjustable system thus guarded against impacts to the trailer from all directions.

Page envisioned a more limited guard in U.S. Pat. No. 4,060,268. His device was designed for a large trailer with the front of the trailer attaching to a "fifth wheel" of the tractor vehicle. This articulated structure comprising prime-mover and towed load represents the consensus design for commercial cargo transport on U.S. highways today. In this concept, the compartmentalized cargo space is fully above the undercarriage. The weight of the transported goods is supported both by the trailer tires at the trailer's rear, and by the prime-mover's rear tires directly underneath the front of the trailer. The Page patent teaches a generally rectilinear rail guard and support system guarding the space between the prime-mover's rear tires and the trailer's rear-situated duals. The guard is adjustable for height but not length, such that sufficient clearance exists to prevent scraping of the guard against the roadway. This system does not contemplate a sliding rear axle system. It also does not address any geometric mismatch between a striking passenger vehicle and the region of the trailer behind the rear duals. Jacobs proposed a dynamic inflatable under-ride guard in the form of an exterior airbag and crash sensing system in U.S. Pat. No. 6,450,556. The purpose of this system is to absorb the impacting vehicle's kinetic energy and prevent under-ride, diminishing the hazard to the impacting vehicle. This patent teaches a plurality of systems, one for the rear, and at least one for each side between the trailer dual rear axles and the prime movers tires to the front of the trailer. Although a sliding rear axle system is envisioned by the inventor, no component of the system deals with the void space between the rearmost axial under-ride guard and the rear of the sliding undercarriage, and therefore the entirety of mismatch about the periphery of the trailer is not addressed.

Schroeder developed a fixed side guard system for sliding axle trailers which provided a conventional mechanical guard for the majority of the length of the trailer between the trailer tires and the prime mover tires. See U.S. Pat. No. 6,626,475. This system of rectangular bars is adjustable for the movement of the rear trailer suspension, but does not provide for side impact protection aft of the trailer tires when the rear undercarriage has been set in a position substantially forward of the rear under-ride guard. Unlike the Page-designed guard, the Schroeder guard was adjustable for axial length, but not height.

Goertz invented an energy absorbing rear under-ride guard that absorbed the kinetic energy of the impacting vehicle through guard rotation in U.S. Pat. No. 7,086,674. In this mechanism, the interacting guard rail is designed to pivot about an axle and resist the impacting force as it displaces from its rearmost position to a more forward position. Within the patent, Goertz describes how this rear guard can be adapted to the side locations forward of the trailer's under-carriage in discrete segments. Thus, the Goertz device does not include an adjustment mechanism and cannot fully address geometric mismatch if a sliding trailer axle is used.

Norelius designed a side impact guard for lorries (box trucks) which present similar impact hazards to passenger vehicles as do articulated trailers. See U.S. Pat. No. 7,188,875. The Norelius invention is adjustable for user access to the underside of the vehicle. In this invention, a stiff sheet unit mostly fills the void space between the lorry's steering tires to the front of the load bearing rear tires. The rectangular guard taught in the patent protects the occupants of impacting vehicles. One novel function described was the ability for the guard to rotate upwards and out of the way when access to the underside of the vehicle was desired. The lorry described in the preferred embodiment has no sliding axle capability, and thus no space behind the rear tires requiring guarding against transverse passenger vehicle impact.

Eriksson patented a conventional side guard for trucks that had the added functionality of acting as a support structure for aerodynamic fairings in U.S. Pat. No. 7,407,204. This non-adjustable guarding structure is for the region between the steer tires to the front and the drive tires to the rear, with no allowance for space behind the rearmost tires and forward of the rear impact guard.

Roush invented a crash attenuating under-ride guard that provided a three-dimensional complex aerodynamic surface structure, unlike the generally planar structures of previous inventions. See U.S. Pat. No. 7,780,224. An inherent function of this design is increased fuel efficiency. The invention incorporates a complex, sculptured surface and does not envision adjustability for a sliding rear axle assembly in any of the preferred embodiments.

Puppini developed a longitudinal impact system for trailers and semi-trailers by creating a novel storage container for spare tires that also provided protection for vehicles that impact the trailer laterally in U.S. Pat. No. 7,967,349. As many, perhaps nearly all, trailers carry spare tires pre-mounted on wheels, a component is already present which, through novel containerization, could provide a crashworthiness safety benefit. This system is not adjustable and provides a low weight penalty crashworthiness benefit. It does not address the impact hazard behind a towed trailer's sliding rear undercarriage.

Finally, in U.S. Pat. No. 8,162,384, Giromini teaches an adjustable side under-ride trailer system with cables, instead of the rigid guards and inflatable airbags taught previously. This design is energy absorbing, distributing the load of the impacting vehicle throughout all of the impacted cables. The invention also uses springs to increase the compliance of the cables thus providing a transverse-impact resistance function. In this design, no provision is made for the region between the rear under-ride guard and the rear of the trailer duals. If the trailer's rear-most tires are located forward from their rear-most position to provide a tire-load optimization, an un-addressed hazard is presented. The Giromini patent only protects the region forward of the trailer's rear undercarriage.

BRIEF SUMMARY OF THE INVENTION

A side under-ride guard system for a sliding axle trailer that includes a plurality of parallel rails connected to the sliding axle trailer and at least one side under-ride guard connected to and repositionable along at least a portion of the length of said rails.

DETAILED DESCRIPTION OF THE INVENTION

Figure 1A:
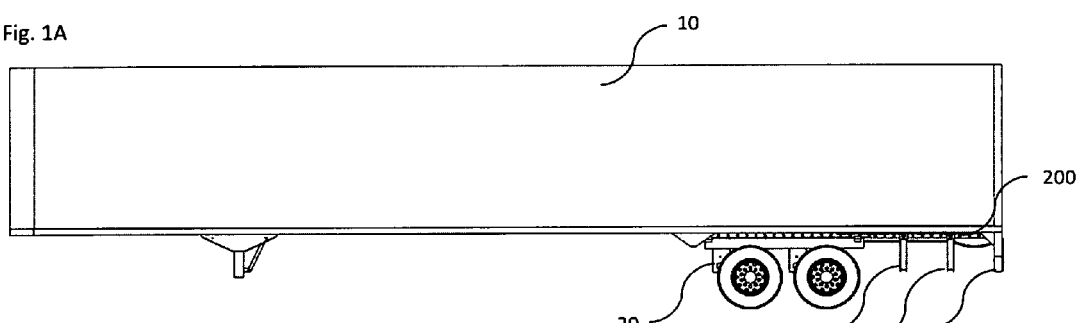
FIGS. 1A and 1B show schematics views of the inventive adjustable side under-ride guard system with a plurality of guards, with the undercarriage in the forward and rearward positions.

The present invention relates generally to semi-trailers with sliding axles, such as van-type trailers. In particular, the present invention relates to an adjustable physical guard that addresses a portion of the impact hazard caused by geometric mismatch. That is, when passenger vehicles strike each other, they are typically equipped with purpose-designed interacting structures to absorb the energy of the crash and to diminish occupant compartment space intrusion. Such structures include the front bumper, rear bumper, and the side-impact bars that are situated within the hinged occupant access doors. These energy absorbing structures are both mandated and regulated by federal statute, for example, FMVSS-208, Occupant Protection. For over the road commercial trailers, only one interacting aspect of the trailer is regulated and mandated to have collision contact-compatibility. That is the rear impact guard, commonly known as the ICC (International Commerce Commission) bar or ICC guard. The geometry and energy absorbing characteristics of this guard are regulated by the US Department of Transportation for the majority of commercial trailers by FMVSS 223, Rear Impact Guards, and FMVSS 224, Rear Impact Protection. These substantially planar and vertical guards are designed and constructed to provide a known minimum level of protection for impacting vehicles when striking the rear of the trailer in a direction perpendicular to the guard. Prior to the mandatory incorporation of these guards into commercial trailers, the decapitation of occupants during rear under-ride collisions was a much more frequent occurrence. The guarding that is mandated for the rear of the trailer has never been extended analogously within North America to the side of the trailer, which presents the same geometric mismatch hazard during passenger automobile to trailer side impact. See generally Bloch, 1998, Trego, 2003, and Padmanaban, 2013. These three technical papers describe and analyze this public health issue.

The present invention diminishes the consequences of impact for certain substantially lateral collisions with respect to the trailer which occur wholly or partially forward of the vertical rear impact guard and aft of the dual axle suspension and/or wholly or partially aft of a stationary under-ride guard and forward of the trailer's front most tires. This invention addresses a segment of the geometric incompatibility hazard present within a substantial fraction, or majority, of U.S. commercial over-the-road trailers with respect to impacting passenger vehicles.

In order to reduce the potential geometric mismatch between laterally impacting passenger vehicles and the trailer's elevated edge; the volume created between either the rear of the tires and the ICC guard or between the rear of a fixed under-ride guard and the front of the tires is partially filled with an impact resistant adjustable under-ride guard. Specifically, at least one, typically generally planar, guard is positioned to prevent a vehicle's hood from moving unhindered beneath the trailer box edge.

Figure 1B:
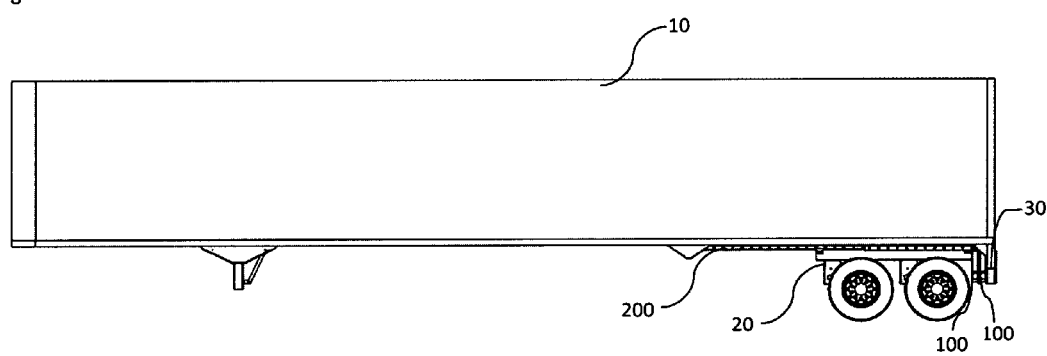

In FIG. 1.A., a trailer 10 is shown as well as sliding axle undercarriage 20 in a forward position and ICC guard 30. Also shown in FIG. 1.A. are two generally planar guards 100 in an extended position. The same elements are shown in FIG. 1.B., but in this depiction, the sliding axle undercarriage 20 is in a rearward position and the guards 100 have been adjusted into a stowed position.

Figure 2:
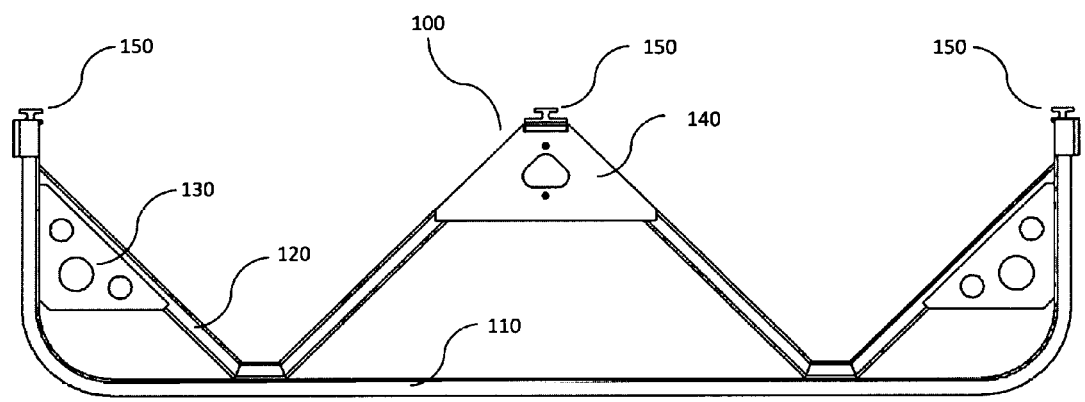
FIG. 2 is an individual guard showing external perimeter surface, internal braces and gussets, and hardened sliders.

As shown in FIG. 2, in one embodiment, these guards 100 may be composed of a U-shaped interaction perimeter 110 that is reinforced using internal reinforcement braces 120. The bracing may be made of hollow rectangular profile tubing. The bracing can welded into a substantially W-shape as shown in FIG. 2. The W-shape of the bracing creates three discrete reinforced triangulated regions within the perimeter. The triangulation braces may themselves be reinforced by two outboard gussets 130 and a single center guard gusset 140. Each guard 100 can contain three guard sliders 150; one at each outboard position and one located centrally. The sliders allow axial adjustment along a portion of the length of the trailer. The guard proper is preferably composed of ductile high yield strength aluminum alloy, for example, 6061-T6. The choice of aluminum alloy allows significant weight reduction over a typical steel guard while also providing superior corrosion resistance. The aluminum components of guard 100 may be welded into a single piece. The guard sliders 150, however, are preferably made of hardened steel to provide increased strength and wear resistance. The guard sliders 150, which mount each moveable guard 100 to the underside of the trailer, are typically coated with grease prior to or during assembly in order to diminish both friction and the effects of corrosion. Note that guard sliders 150 cannot typically be welded to the sliding guard if incompatible ferrous and non-ferrous alloys are used, as is envisioned in the preferred embodiment. In such case, the steel slider is preferably attached to the aluminum guard using one or more common but appropriate mechanical fasteners such as rivets, pins, or bolts.

Figure 3:
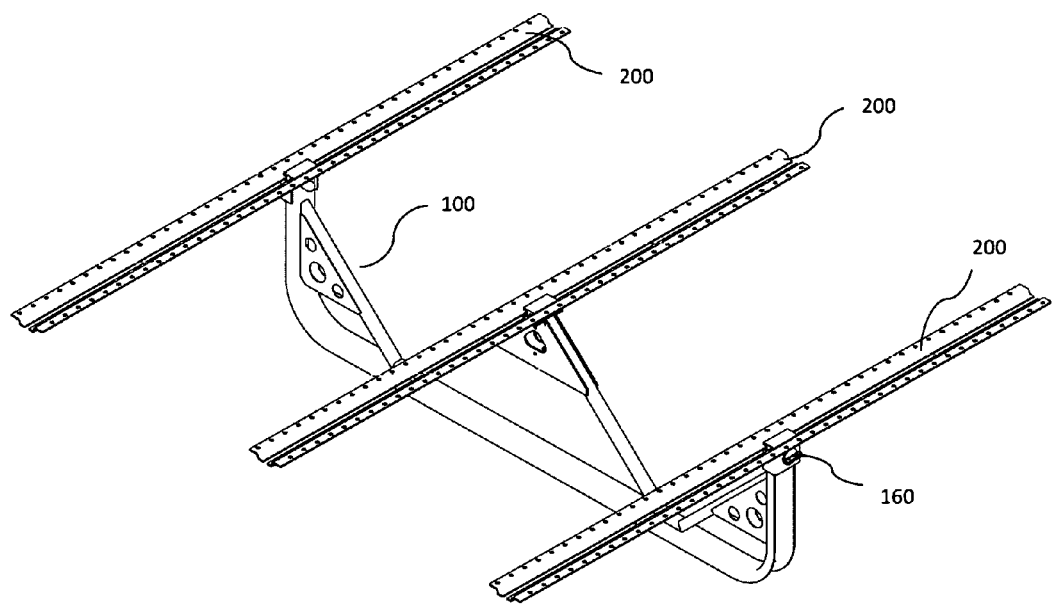
FIG. 3 shows the three slide rails and a single guard in a mid-position.
Figure 4A:
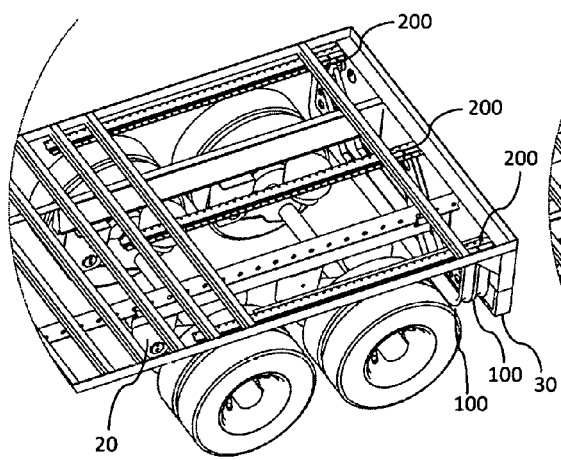
FIGS. 4A and 4B show the rails in the extended and stowed positions in a cutaway through the bed of a sliding rear axle trailer.
Figure 4B:
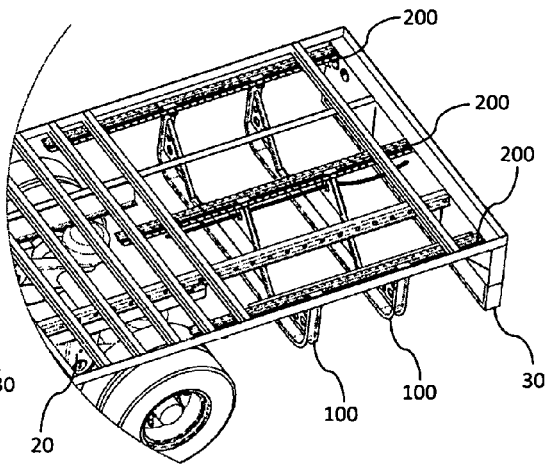
Figures 5A, 5B:
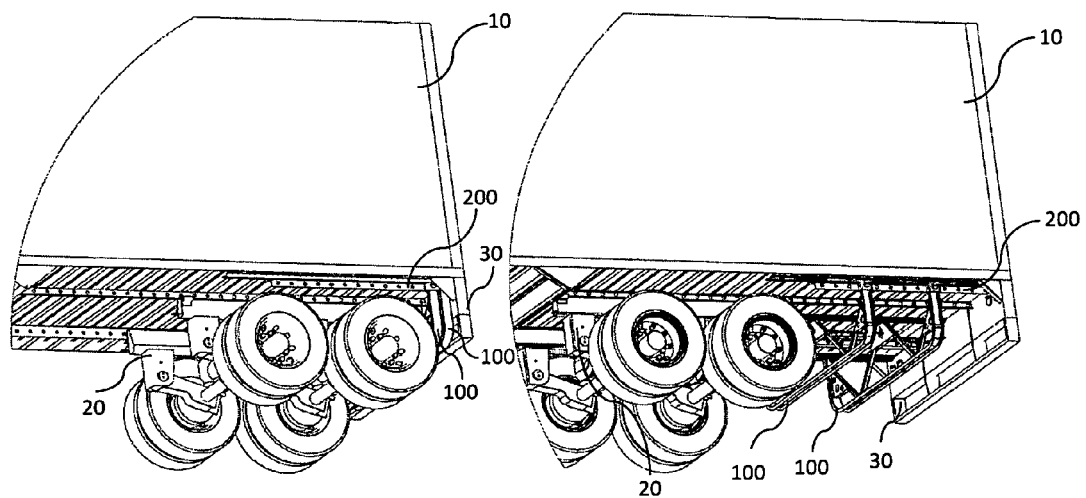
FIGS. 5A and 5B show an external oblique view of a sliding axle trailer equipped with the instant invention with the undercarriage in the rearward and forward positions.

Each sliding guard 100 may thus be mounted to three parallel slide rails 200 which are located above the sliding guards but below the trailer box as depicted in FIG. 3. These roll formed or extruded linear members may be slotted box sections in profile. They are typically aligned axially with the trailer and welded or mechanically fastened to the underside of the trailer floor. In the preferred embodiment, there is one slide rail 200 near or at each outboard trailer edge, and a single slide rail 200 along the trailer centerline as depicted in cutaway views in FIG. 4.A. (in stowed position) and FIG. 4.B. (in extended position). The slide rails 200 are lightened in the preferred embodiment by using circular punch-outs as depicted. The circular punch-outs are used to fix each sliding guard 100 in place once the desired axial position is reached using pin 160. Alternatively, the existing rails of the trailer's sliding rear undercarriage could be used as the mounting and adjustment rails of the side impact under-ride guard system. Oblique views corresponding to the cutaway views shown in FIGS. 4.A. and 4.B. are shown in FIGS. 5.A. and 5.B.

Figure 6A:
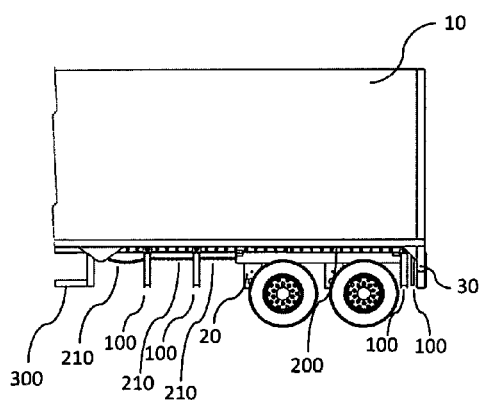
FIGS. 6A and 6B show an alternative embodiment of the inventive side under-ride guard system.
Figure 6B:
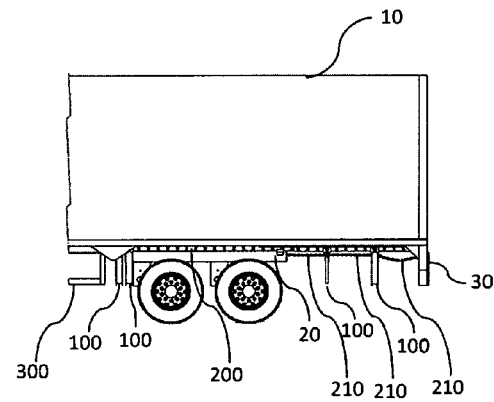

FIGS. 6.A. (with rear guard in the stowed position) and 6.B. (with rear guard in the extended position) show an alternative embodiment of the inventive side under-ride guard system. In this embodiment, two sets of movable guards are used. A second set of axially adjustable side under-ride guards 100 has been located between a fixed under-ride guard 300 (such as the type described in Schroeder above) and the forward location of the moveable trailer undercarriage.

The axial positioning of each sliding guard 100 along the underside of trailer 10 can be performed either manually as shown in the preferred embodiment or semi-automatically. If manually, then the tractor-trailer operator or mechanic can physically push or pull each of the one or more sliding guards into place after the trailer undercarriage 20 has been moved into its desired position. If it is desired to reposition a plurality of axial sliding guards semi-automatically, then, as shown in FIGS. 6.A. and 6.B., cables 210, that may be similar to the cables used on pickup truck tail gates may be used to connect relevant guard elements sequentially. That is, when using two sliding side under-ride guards, once the undercarriage has moved from its furthest rearward position to approximately ~1/3 of its maximum axial forward displacement, then a cable, chain, or inflexible linkage draws the lead sliding guard 100 forward as the undercarriage continues onward. When the adjustable guards are located behind the rear wheels, if the undercarriage can move X distance from its rearmost position, then the forward-most sliding guard cannot exceed ~X/3 in distance from the rear undercarriage. Two other cable sets can ensure that the lead and trail sliding guards 100 cannot exceed ~X/3 distance apart, and the rear-most sliding guard 100 cannot exceed ~X/3 distance from the ICC bar 30 which defines the end of the trailer. In each instance, slack must be used for the cables (or chains, or inflexible linkages) in order to provide some compliance within the system.

A commodity quick release ball bearing pin 160 or other fastener may be used to affix at least one outboard guard slider 100 in place to prevent unwanted axial motion after being set in the desired axial position, as was shown in FIG. 3. Said pin is placed through both the slide rail 200 and also through the guard slider 150. One, two, or more such pins may be used. When positioned correctly, the two sliding guards 100 will generally trisect the axial space behind the trailer's undercarriage that is designed to be protected. This tri-section may be geometrically imperfect as each circular punch-out in each slide rail 200 exists at a discrete position. That is, infinite axial adjustment of the axial position of the sliding guard 14 is not possible in the preferred embodiment. Of course, if the fixation method used is a complex clamping system, rather than a pin system, then infinite adjustment of the sliding guards 14 could be realized, and this clamping system is specifically envisioned as an alternative embodiment of the instant invention. Further, it is envisioned that if cables, chains, or inflexible linkages are made sufficiently robust to tie the individual components together, then a final positioning pin system may be unnecessary, as the guards will not substantially change position and load can be transferred from one segment to the next during lateral passenger vehicle impact.

Although the preferred embodiment of the patent is shown in the several illustrations, this patent addresses the function of guarding a particular space and envisions various other similar but distinct embodiments that are likewise capable of addressing the unguarded space aft of the trailer's undercarriage and forward of the ICC guard or aft of a fixed under-ride guard and forward of the trailer wheels. These include:

1. The number of sliding guards can be a different number than the two shown within the illustrative drawings. It could be as few as 1, or as many as 10. To reduce the potential for catastrophic geometric mismatch, if the distance between the rear wheels and the ICC guard (or between a front guard and the front wheels) exceeds 6 feet but is less than 12 feet, a single guard positioned equidistantly between these structures is preferred. If the distance between the rear wheels and the ICC guard (or between a front guard and the front wheels) is greater than 12 feet but less than 18 feet, a pair of guards that are positioned equidistantly between these structures is preferred.

2. The shape of the guards as shown in the preferred embodiment was chosen to have an efficient strength-to-weight ratio. Other guard shapes can also be used, but the general perimeter of the interaction surface at the exterior of the guard should retain the generally vertical surface that is generally parallel and at the same outboard position as the exterior of the trailer box in order to provide the function of geometric compatibility between the trailer and the impacting vehicle.

3. The plurality of sliding guards, in the stowed position, is visible, one after the other, in a horizontal stack in FIG. 1.B. The invention alternatively envisions a narrower nesting stack of guards such that when the undercarriage is in the aft-most position, the number of guards visible may be as few as one, or even zero, if the sliding guards nest within the structure of the ICC guard 30.

4. The sliding guards could be different in general construction than the ICC guard, or identical to the ICC guard. That is, the preferred embodiment envisions optimizing the sliding guards for side impact, while the ICC guard is optimized for rear impacts by passenger vehicles. However, there is no reason that the general structure below the attachment point could not be essentially identical in geometry with the rearmost generally planar guard fixed, and the remaining guards repositionable.

5. The guards shown in the preferred embodiment are impact independent with respect to loading. That is, a force applied to one guard will absorb that load and minimally deflect. This invention also envisions manually or automatically extending inter-guard linkages, such that placing a transverse load to one guard will transmit loading and deflecting to one or more other sliding guards.

6. The guard in the preferred embodiment uses three guide rails for the mechanism of repositioning the generally planar sliding side guards. These are two outboard and one center rails (or tracks). However, this number may be increased or diminished. A greater number of rails would increase the points of fixation of the sliding guards, which would provide a rigidity and strength benefit for some designs. However, it is also envisioned that these three rails could be deleted altogether without loss of function if the two existing inboard rails that are used for the sliding trailer undercarriage were integrated into the sliding rear guard mechanism. Thus a weight savings could be attained by attaching these guards directly to existing rail components, simplifying the system.

7. The preferred embodiment envisions wrought aluminum alloys as the material of choice for the impact absorbing guards with steel some wear-resistant components such as the sliders. This material choice diminishes the overall weight of the guarding system. Weight savings is of concern to users of the system to increase fuel efficiency. However, it is envisioned that other materials may be used besides wrought aluminum, such as steel, titanium or composites.

8. The preferred embodiment does not extend automatically but must be repositioned by hand. However, another embodiment of the invention uses a secondary mechanism to pull the guard segments along as the trailer's undercarriage is pulled forward. Thus, by using chains, cables linkages, the movement of the trailer's undercarriage could automatically reposition the guards to a pre-determined location. It is also possible that a power source independent of the carriage could be used to reposition the guards without substantial physical effort by the operator.
9. This mechanism is as axially adjustable as the pins in the sliding undercarriage are. It could be "infinitely" adjustable with clamps.
10. While this invention in the preferred embodiment is positioned to the rear of the axially movable undercarriage, it is also explicitly recognized that this design could be used forward of the undercarriage to fill a void between a fixed side guard (such as that conceived by Schroeder) and the undercarriage when the undercarriage is moved to the fully rear position. In Schroeder's invention, the fixed guard must not interfere with the undercarriage at the fully forward position. Therefore, by configuring the instant invention to be in front of the undercarriage but behind the rear of the fixed guard, the same function can be realized. Thus, the present invention is for a sliding guard of the type described for either behind (as in the preferred embodiment), or in front of, the sliding undercarriage.

What is claimed is:

1. A side under-ride guard system for a sliding axle trailer, comprising:
    A plurality of parallel rails connected to said sliding axle trailer, and
    A side under-ride guard connected to and repositionable along at least a portion of the length of said parallel rails.
2. A side under-ride guard system in accordance with claim 1, wherein said guard is positioned between a rear-most wheel and an ICC guard of said sliding axle trailer.
3. A side under-ride guard system in accordance with claim 1, wherein said guard is positioned between a stationary under-ride guard and a forward-most wheel of said sliding axle trailer.
4. A side under-ride guard system in accordance with claim 1, wherein said guard is temporarily affixed to said rails using a plurality of removable pins.
5. A side under-ride guard system in accordance with claim 4, wherein said pins are quick release ball bearing pins.
6. A side under-ride guard system in accordance with claim 1, wherein said rails are slotted box sections in profile.
7. A side under-ride guard system in accordance with claim 1, wherein said system includes a plurality of guards.
8. A side under-ride guard system in accordance with claim 7, wherein said system consists of three parallel rails and two guards.
9. A side under-ride guard system in accordance with claim 1, wherein said guard has an external perimeter structure that is capable of preventing a vehicle's hood from moving unhindered beneath said sliding axle trailer when said vehicle's hood contacts said external perimeter structure.
10. A side under-ride guard in accordance with claim 1, wherein said external perimeter structure is fabricated from an aluminum alloy.
11. A side under-ride guard system in accordance with claim 9, wherein said guard further includes a plurality of internal reinforcement braces.
12. A side under-ride guard system in accordance with claim 11, wherein said internal reinforcement braces are substantially W-shaped.
13. A side under-ride guard system in accordance with claim 11, wherein said guard further includes at least one gusset.
14. A side under-ride guard system in accordance with claim 13, wherein said guard includes a plurality of gussets.
15. A side under-ride guard system in accordance with claim 1, wherein said guard further includes a plurality of sliders that connect said guard to said rails.
16. A side under-ride guard system in accordance with claim 15, wherein said sliders are fabricated from hardened steel.
17. A side under-ride guard system in accordance with claim 1, wherein said rails are integral components of said sliding axle trailer.
18. A method of adjusting a side under-ride guard system having a plurality of parallel rails, a side under-ride guard, and a plurality of pins connecting said guard to said rails, comprising:
    a. Removing said pins;
    b. Repositioning said guard along said rails; and
    c. Reinserting said pins.
19. A method of adjusting a side under-ride guard system in accordance with claim 18, wherein said guard system includes a plurality of guards, said guards are attached to one another by at least one inter-guard linkage, such as a cable, and said repositioning step is assisted, at least in part, by said inter-guard linkage.
20. A side under-ride guard system for a sliding axle trailer, comprising:
    At least three parallel rails connected to said sliding axle trailer, and
    A side under-ride guard connected to and repositionable along at least a portion of the length of said parallel rails, wherein said guard is positioned between a rear-most wheel and an ICC guard of said sliding axle trailer, said guard is temporarily affixed to said rails using a plurality of quick release ball bearing pins, said rails are slotted box sections in profile, said guard has an external perimeter structure that is capable of preventing a vehicle's hood from moving unhindered beneath said sliding axle trailer when said vehicle's hood contacts said external perimeter structure, said external perimeter structure is fabricated from an aluminum alloy, said guard further includes a plurality of internal reinforcement braces, and said guard includes a plurality of reinforcing gussets.

* * * * *